(No Model.)
A. D'LANOY.
VALVE.
No. 388,766. Patented Aug. 28, 1888.
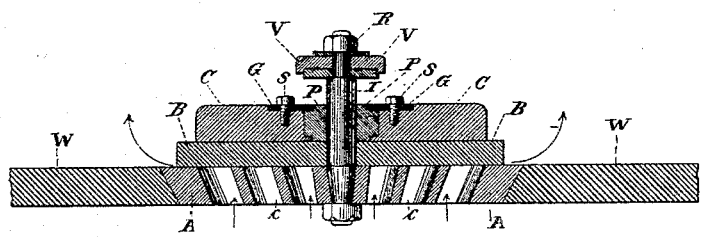
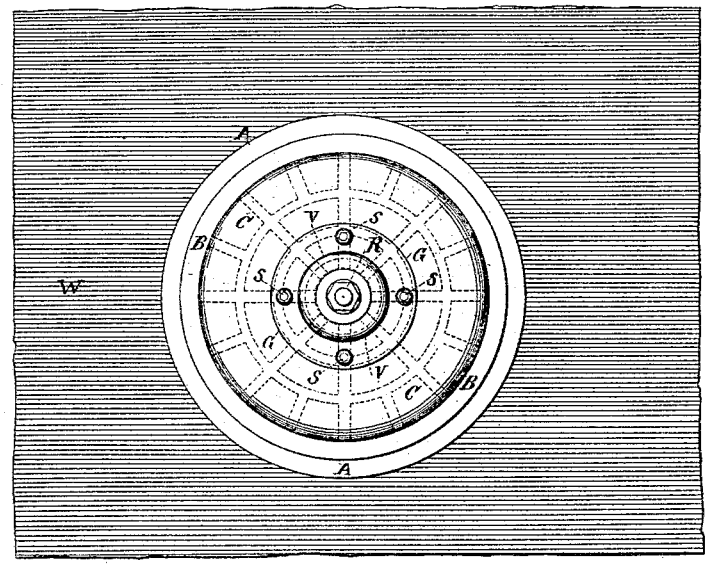
Witnesses:
B. von Brültzingslöwen.
C. E. McDonald
Inventor.
Alfred D'Lanoy.
By Attorney Jinger & Ebner

UNITED STATES PATENT OFFICE.

ALFRED D'LANOY, OF NEW YORK, N. Y., ASSIGNOR OF ONE-HALF TO JAMES K. FROTHINGHAM AND HERMAN W. WINANS, OF SAME PLACE.

VALVE.

SPECIFICATION forming part of Letters Patent No. 388,766, dated August 28, 1888.

Application filed June 21, 1888. Serial No. 277,824. (No model.)

*To all whom it may concern:*

Be it known that I, ALFRED D'LANOY, a citizen of the United States, residing at the city of New York, in the county of New York and State of New York, have invented a new and useful Improvement in Valves, of which the following is a specification.

My invention relates to that class of valves commonly known as "exit-valves," and which are used for the exit of water from the cylinder to the exit-pipe of a force-pump.

The nature of the invention consists in the details of construction and combination substantially as illustrated in the drawings, hereinafter described, and subsequently pointed out in the claim.

Figure 1 is a vertical axial sectional view of the exit-valve of a force-pump with my improvement attached. Fig. 2 is a plan view of the same.

Heretofore it has been found in large force-pumps which were propelled by great power and which lifted large amounts of water that the action of the cylinder and the consequent motion of the exit-valve produced a violent concussion of the valve upon its seat whenever the valve closed. This soon pounded out the packing of the valve, so that in a short time it became comparatively worthless. To remedy this the stem of the valve was prolonged upward, and a helical spring fastened on the top of the stem and resting upon the top of the valve was so arranged that when the piston came to its short pause in turning from one way to the other in its reciprocating motion the spring would close the valve upon its seat before the return motion of the piston could act to produce a pound; but it was found that there was a great loss of power, which was expended in lifting the valve, and that on account of the uneven adhesion of the valve to its seat and the consequent oblique motion of the valve in rising the stem, which was of softer material than the valve, was soon so worn away that it was practically worthless and had to be taken out and a new stem inserted. This caused a great expense of time and trouble. It is to remedy these defects that my invention has been devised.

In the drawings, A designates the valve-seat; B, the packing of the valve; C, the valve; I, the valve-stem, and W the wall of the pump-cylinder. The stem I of the valve is securely fastened in its place in the seat A by means of a nut. The gum packing B covers the ports c, so as to prevent the escape of water when the valve is closed. The valve C, which is of metal, is made of such weight that it will of itself close as soon as the pressure caused by the motion of the piston is slackened and before the return-stroke of the piston, so that no pounding can occur. To prevent wearing of the stem I on account of any oblique motion of the valve, I place a rubber bush (designated by P) around the stem I within the valve C. A metallic ring, G, secured by bolts S, holds this bush in its place. A washer, V, secured upon the upper end of the stem I by the nut R, limits the upward motion of the valve, the whole mechanism to be substantially as illustrated in the drawings.

This valve, as before said, is to be used for the exit-valve of a force-pump, and it has been found that there is much less power required to lift this valve than for any other heretofore in use. It has also been found that any uneven or oblique motion of the valve does not abrade the stem, for the elasticity of the gum bush P quickly corrects such unevenness of motion, and also prevents any part of the metal of the valve from coming into contact with the stem. By reason of these two advantages the expense of running a pump provided with my improved valve has by experiment been found to be very much less than that required for a pump provided with any other valves now in use.

What I claim as my invention, and desire to secure by Letters Patent, is—

The combination, with the wall W of a force-pump, the valve-seat A secured therein, and the valve-stem I, secured in said seat, as specified, of the gum packing B, interposed between the said seat A and the valve C, the valve C, working upon said stem I and said seat A, and carrying the said packing B, the gum bush P within said valve C and around said stem I, the ring G, holding said bush in place in said valve, the screws S, securing said ring G in proper position, the washer V, and the nut R, holding said washer upon the said valve-stem I, to limit the upward motion of said valve, all substantially as and for the purpose set forth.

In witness whereof I hereunto set my hand in presence of two witnesses.

ALFRED D'LANOY.

Witnesses:
FREDK. W. RUBREN,
C. E. McDONALD.